Sept. 6, 1927. 1,641,462
C. O. STOHLGREN
BUTTON MAKING MACHINE
Filed Oct. 20, 1924 3 Sheets-Sheet 3
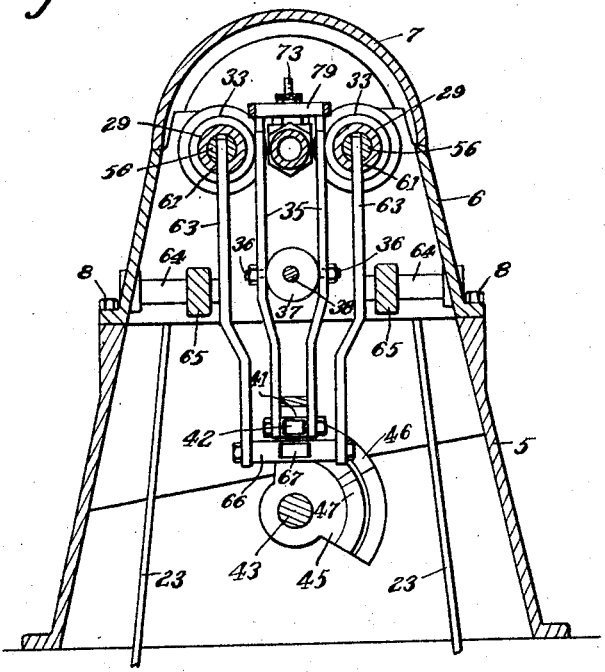
Fig. 6.
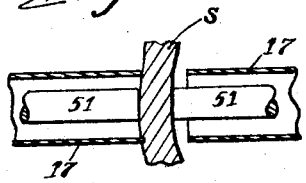
Fig. 10.
Fig. 11.
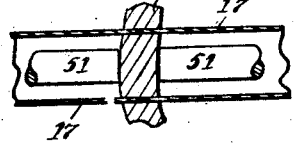
Fig. 12.
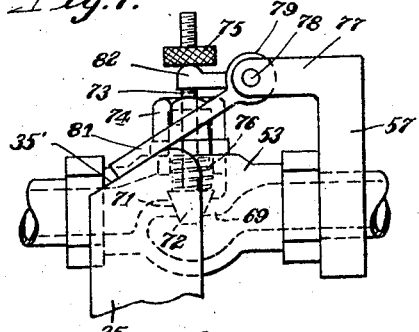
Fig. 7.
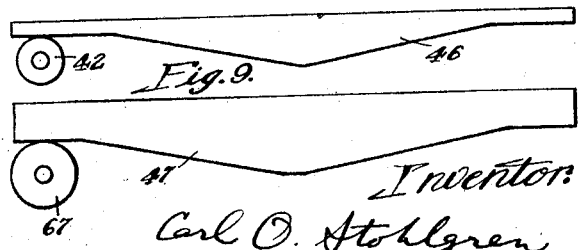
Fig. 8.
Fig. 9.
Inventor
Carl O. Stohlgren
By Wilson & McKenna
Attys.

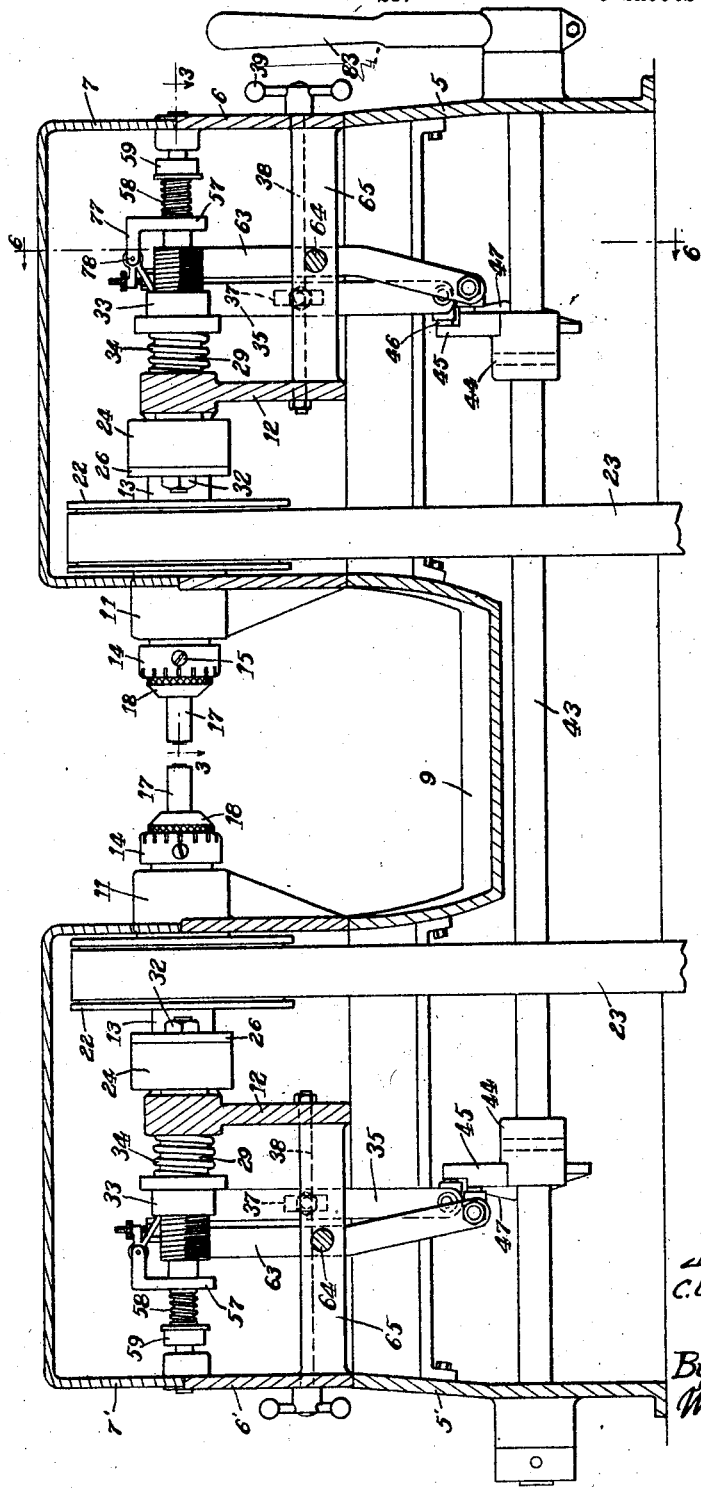

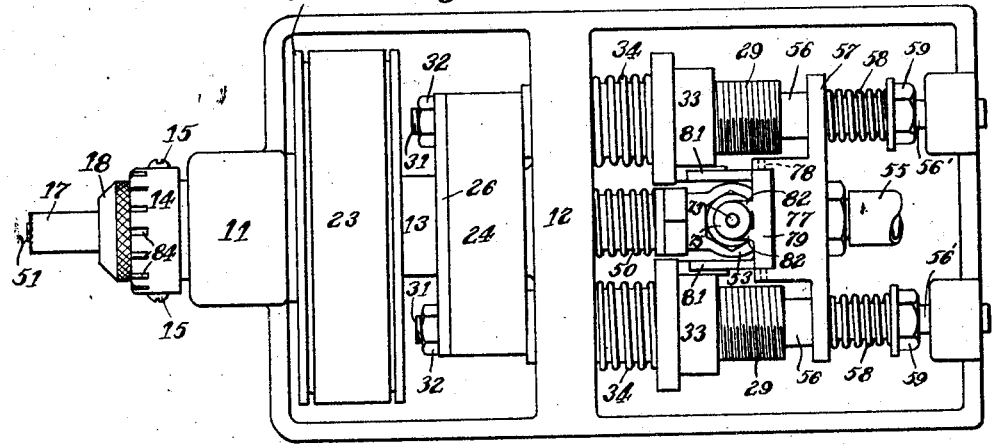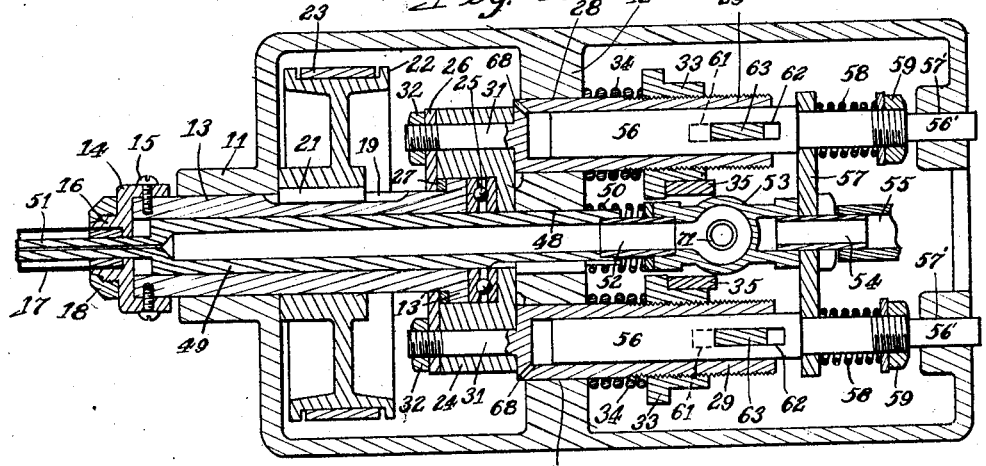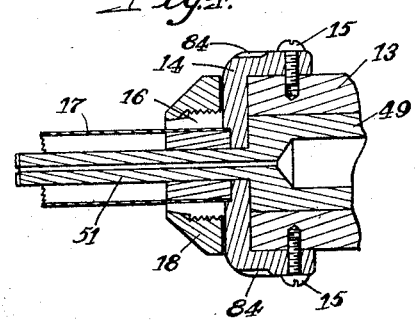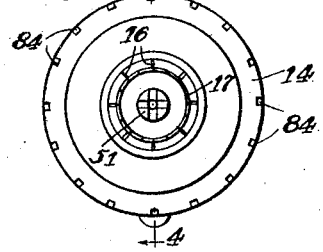

Patented Sept. 6, 1927.

1,641,462

UNITED STATES PATENT OFFICE.

CARL O. STOHLGREN, OF ROCKTON, ILLINOIS.

BUTTON-MAKING MACHINE.

Application filed October 20, 1924. Serial No. 744,568.

This invention relates to machines employed for cutting pearl button blanks from mussel shells and the like.

One object of my present invention is to provide an improved blank cutting machine which will obviate the splintering and burr formation produced in previous machines and do away with the necessity of the subsequent grinding operation to remove the burr and dress the blank for the button making machine. This object is attained in my present invention through the employment of a pair of oppositely facing tubular cutters which, in the blank sawing operation, enter the face and back of the shell respectively and cut toward the center. The bodily movements of the two saws are so timed that one operates slightly in advance of the other, cutting to or slightly past the center of the shell, and then receding, while the other saw continues its advance until the blank is completely excised. Other objects are to provide, in a machine of the character stated, an improved and simplified mechanism for feeding the clamps or chucks onto and into the shell under a yielding or elastic thrust that lessens the liability of injury to the work, to provide a simple means for adjusting the spacing of the saws to accommodate shells of varying thickness while insuring the complete excision of the blank, to provide a simple and easily manipulated manual operating means for effecting the advance movements of the clamp bars and saws on the work, including a hand lever and cams so constructed and arranged that a complete blank cutting operation is performed at each swing of the lever without involving any idle return movement of the latter, to provide an improved automatic means for controlling the supply of cooling water to the blank and saws during the cutting operation, and to provide a saw holder that shall facilitate the operation of resharpening the saw by providing an index to insure the accurate positioning of the teeth of the saw in relation to the sharpening tool.

Still other objects and attendant advantages of the invention will be apparent to persons skilled in the art as the same becomes better understood by reference to the following detailed description, taken in connection with the accompanying drawings in which I have illustrated a practical and approved embodiment of the principle of my invention, and in which—

Fig. 1 is a side elevation of the complete machine, partly in vertical section through the housing thereof;

Fig. 2 is a top plan view of the right hand end of the machine, viewing Fig. 1, with the cover of the casing removed;

Fig. 3 is a horizontal section on the line 3—3 of Fig. 1, looking downwardly;

Fig. 4 is an enlarged sectional detail of the forward end of the saw spindle, the hollow clamp rod mounted therein and the saw holder;

Fig. 5 is a front elevation of Fig. 4;

Fig. 6 is a vertical transverse section taken on the line 6—6 of Fig. 1;

Fig. 7 is a detail in side elevation of the valve controlling the water supply and its automatic actuating mechanism;

Figs. 8 and 9 are projections of the saw and clamp operating cams, respectively; and Figs. 10, 11 and 12 are detail sectional views illustrating progressive steps in the operation of cutting the blank from the shell.

Referring to the drawings, 5 and 5' (Fig. 1) designate a pair of hollow base frames resting on the floor and surmounted by hollow upper frames 6 and 6' respectively removably attached to the base frames by screws 8 (Fig. 6). The upper frames 6 and 6' are in turn surmounted by transversely rounded cap or cover plates 7 and 7'. The hollow structures thus formed by the members 5, 6, 7 and 5', 6' and 7', constitute supports and housings for the principal operating parts of two opposed sets of shell-clamping and cutting mechanisms, with the saw holders and saws and the shell-engaging ends of the clamps disposed symmetrically between them, as clearly shown in Fig. 1. Between the inner ends of the base frame members 5 and 5' is mounted a pan 9 preferably formed with a transversely inclined bottom wall to receive and direct the water and sawdust to one side of the machine.

Since the saw and clamp-operating mechanisms in the two housings are duplicates in construction and mode of operation, and differ only slightly in the relative periods of operation of the saws, a description of one will suffice for both.

On the inner end of the intermediate frame member is a bearing boss 11 (Fig. 3), and within the frame member is a transverse wall 12 that constitutes a support for certain sliding elements of the mechanism hereinafter described. Journaled in the boss 11 is a hollow saw spindle 13, on the projecting end of which is mounted the saw head or carrier best shown as to detail structure in Figs. 4 and 5, and comprising a cap 14 fitting over the end of the spindle and secured thereon by screws 15, said cap having an integral longitudinally split boss 16 in which the inner end of the tubular saw 17 is entered and clamped by a binding nut 18. The portion of the spindle within the housing is formed with a longitudinal keyway 19 (Fig. 3) engaged with a key 21 in the hub of a pulley 22 that is driven by a belt 23 from a source of power beneath the frame. The inner end of the spindle 13 is formed with a radial flange 13' that is entered in a central socket in a cross-head 24 lying in front of the frame wall 12, and the inner end of said spindle and its flange are backed by an anti-friction thrust bearing 25 at the base of said socket. A cover-plate 26 and washer 27 attached to the front of the cross-head 24, through engagement with the flange 13', lock the spindle in the socket of the cross-head.

At equal distances on opposite sides of the axis of the spindle 13 the casing wall 12 is apertured to form bearings 28 for a pair of tubular members 29 formed on their forward ends with tenons 31 passed through registering apertures in the cross-head 24 and cover-plate 26 and secured in said cross-head by nuts 32. The tubular members 29 are externally threaded to receive flanged nuts 33, and between the nuts 33 and the adjacent side of the wall 12 are compression springs 34 encircling the tubular members 29; said springs 34 serving to retract the spindle and saw when the blank cutting operation is completed. The advance movement of the saw to and into the shell to be cut is effected through the agency of a pair of vertically disposed parallel levers 35 which at points slightly below their upper ends lie behind and operatively engage with the inner portions of the flanges of the nuts 33, as clearly shown in Fig. 3. These saw-actuating levers 35 are fulcrumed intermediate their ends on pintles 36 (Fig. 6) at diametrically opposite points on the periphery of a disc 37 that in turn is mounted on a threaded rod 38 (Fig. 1) journaled in the end wall of the frame member 6 and its transverse wall 12, and provided on its outer end with a hand wheel 39. As shown in Fig. 6, the lower ends of the levers 35 are connected by a bar 41 in which is vertically journaled a cam follower 42.

Journaled in and lengthwise of the base frame members 5 and 5' is a cam shaft 43 (Fig. 1), fast on which is a hub 44 carrying a cam segment plate 45, one such cam plate being provided for each of the right and left groups of mechanism. On the face of the cam plate 45 are formed two concentric arcuate outer and inner cams 46 and 47, respectively, best shown in Fig. 6, and also shown in plane projection in Figs. 8 and 9.

Referring next to the shell clamping and water supply mechanism, slidably mounted within the saw spindle 13 and a central bearing 48 in the wall 12 is a hollow arbor 49 formed with a reduced forward end portion or chuck 51 that extends through the saw holder and saw. The rear end of the arbor 49 is connected by a short tube section 52 (Fig. 3) to the outlet branch of a valve casing 53, this latter being shown in side elevation in Fig. 7. The inlet branch of the valve casing 53 communicates through a short tube section 54 with a water supply pipe or hose 55. Between the outlet branch of the valve casing 53 and the wall 12 is interposed a thrust spring 50. Slidably mounted in the tubular members 29 are a pair of rods 56 that pass through apertures in a cross-head 57 and have their rear reduced ends 56' slidably mounted in bearings 57' in the rear wall of the upper frame member. Encircling the rods 56 are compression springs 58 confined endwise between the cross-head 57 and adjusting nuts 59 threaded onto the rods 56. The lower sides of the tubular members 29 have at their rear ends longitudinal slots 61, through which, and through registering slots 62 in the rods 56 extend the upper end portions of a pair of levers 63. These levers, as shown in Figs. 1 and 6, carry laterally projecting pivot pins 64 journaled in the opposite sides of the upper frame member and in longitudinally disposed bars 65 extending between the rear wall and the intermediate wall 12 of the frame member. The lower ends of these levers 63 are connected by a cross-bar 66 in which is vertically pivoted a cam follower 67 that co-operates with the inner cam 47.

The forward ends of the chambers of the tubular members 29 are vented to the atmosphere through ports 68 (Fig. 3) to avoid compression and rarefaction of the air under relative sliding movements of the tubes 29 and their contained rods 56.

Referring to Fig. 7, within the valve casing 53 is a bridge 69 in which is formed a valve seat 71 connecting the inflow and outflow passages of the casing. Fitted to the seat 71 is a valve 72, the stem 73 of which extends upwardly through a stuffing box 74 on the upper side of the casing and is threaded to receive an adjusting nut 75. The valve 72 is normally held on its seat 71 by a compression spring 76. The cross-head 57 at its upper end is formed with a central horizontal forked extension 77 (Fig. 2) between the forks of which is pivoted at 78 the hub 79 of an elbow lever that includes a pair of downwardly and forwardly inclined arms 81 straddling the valve stem and its packing and an intermediate pair of horizontally disposed arms 82 that at their free ends underlie the nut 75. The upper ends of the saw-actuating levers 35 are preferably formed with downwardly and forwardly inclined edges 35' that engage and co-operate with the under sides of the arms 81 of the valve opening lever. On one end of the cam shaft 43 is an operating handle 83 for oscillating the same.

The saw-advancing cams at the two ends of the machine are so set that the movement cycles of the two saws while practically simultaneous do not exactly coincide, each being alternately slightly in advance of the other under the to and fro swings of the operating lever 83. It will also be observed by reference to Figs. 8 and 9 that the chuck-operating cams 47 are slightly longer than the saw-operating cams 46. Briefly describing the operation of the machine, with the parts in the relative positions shown in Figs. 1, 2 and 3, the operator inserts a shell S (Figs. 10, 11 and 12) between the opposed working ends of the saws and chucks. With the saw spindles rapidly driven by the belts 23, the handle 83 is swung in one direction, which first causes an inward movement of the chucks 51 onto the work, this being accompanied by a corresponding movement of the saws. As illustrated in Figs. 10, 11 and 12, the saw at the left is moving slightly in advance of that at the right, so that it first engages one side (the back as herein shown) of the shell and has begun to cut through the same by the time the other saw reaches the face of the shell. Both saws then continue to advance on their cutting movements until the left hand saw has cut half way, or a trifle more, beyond the transverse center of the shell as shown in Fig. 11. At this point its cam follower 42 passes the peak of the cam 46, and the left-hand saw begins to retreat under the back thrust of the springs 34, while the right-hand saw continues its advance to a point where it reaches and passes slightly beyond the inner end of the kerf formed by the left-hand saw as shown in Fig. 12 whereupon the cam follower of the right-hand saw passes the peak of its cam and begins to retreat. By the time the saws have withdrawn from the shell, the chucks 51 retreat under the thrust of the springs 50, and leave the excised blank free to drop. It will be observed that the working thrust of both the chucks is an elastic or yielding thrust, being transmitted through the springs 58 while the thrust of the saws is positive. The spacing of the chucks to accommodate variations in thickness of different batches of shells to be cut can be adjusted by turning the nuts 59 up for thin shells and backing them off for thick shells. Similarly, the spacing of the saws for a like purpose can be adjusted by shifting the fulcrum of the saw levers 35 through manipulation of the adjusting screws 38. As the saws advance onto and into the work, the saw-advancing levers 35 open the valve 72 to allow water under pressure to flow through the hollow arbor 49 and chucks 51 onto the work; and on the retreat of the saws and their operating levers 35 the valve is automatically closed by the spring 76 and the water supply thus shut off.

On the return or back swing of the lever 83 the above-described operations are repeated, but in that case the right-hand saw, viewing Figs. 1, 10, 11 and 12, operates slightly in advance of the left-hand saw. By employing the double-faced cams shown, a complete shell-cutting operation may be performed at each to and fro swing of the hand lever 83, which avoids the time incident to an idle return movement of the operating lever.

Referring to Figs. 2 and 5, it will be observed that the periphery of the saw holder 14 is formed with a series of equally spaced notches 84 which facilitate indexing of the saw when resharpening the same in a resharpening machine; the saw being set in the head so that diametrically opposite teeth thereof coincide with diametrically opposite notches 84 of the head. The head being turned during the sharpening operation to bring the notches 84 successively into register with the line of travel of the file or other sharpening tool, the accurate and rapid resharpening of the teeth is facilitated.

One of the principal advantages of my invention is that it enables increased production over prior button blank cutting machines, because of the quicker cutting action, greater accuracy in cutting the shell, and the uniformity of the cutting action. By reason of the method disclosed herein there is practically no waste from the cutting element breaking through the shell. Furthermore, skilled help is not necessary; and the machine is much easier to operate at a given rate than prior machines.

I have herein shown and described one simple and compact embodiment of the operative principles of my invention, but manifestly the details of structure and organization may be considerably modified and varied from those shown without involving any departure from the substance of the invention or sacrificing any of the advantages inherent therein. Hence, I do not limit the invention to the details herein disclosed, but reserve all such variations and modifications thereof as fall within the spirit and purview of the appended claims.

I claim :—

1. In a button blank cutting machine, the combination with a pair of alined oppositely facing tubular saws, of means for chucking the blank to be cut between said saws, means for rotating said saws, means for advancing and retracting said saws each partly through the blank from opposite sides of the latter respectively, the saw advancing and retracting means of one saw being timed to operate with a slight lead over that of the other, the said chucking means having means for supplying a liquid under pressure thereto, and automatic means for operating the latter in the advancing and retracting of the saws to admit and shut off the liquid in the in and out movements respectively.

2. In a button blank cutting machine, the combination of a frame, a hollow saw spindle journaled therein, a tubular saw mounted on one end of said spindle, a hollow arbor slidably mounted in said saw spindle, an axially bored chuck member on one end of said arbor and extending lengthwise through said saw, means for advancing said spindle and arbor to the work, means for supplying water under pressure to said arbor, and automatic means for controlling the last mentioned means so that it supplies water to the arbor only when the spindle and arbor are advanced.

3. In a button blank cutting machine, the combination of a frame, a hollow saw spindle journaled therein, a tubular saw mounted on one end of said spindle, a hollow arbor slidably mounted in said saw spindle, an axially bored chuck member on one end of said arbor and extending lengthwise through said saw, means for advancing said spindle and arbor to the work, means for supplying water under pressure to said arbor, said last-named means including a cut-off valve, and means for opening said valve adjustable on the advance movement of said spindle.

4. In a button blank cutting machine, the combination of a frame, a hollow saw spindle journaled therein, a tubular saw mounted on one end of said spindle, a hollow arbor slidably mounted in said saw spindle and terminating at one end in an axially bored chuck member extending lengthwise through said saw, a lever pivoted in said frame, thrust connections between said lever and said spindle, another lever pivoted in said frame, thrust connections between said last-named lever and said arbor, means for rocking both of said levers to advance said spindle and arbor to the work, means, including a spring-closed cut-off valve, for supplying water under pressure to said arbor, and means actuated by said first-named lever for opening said valve on the advance movement of the spindle.

5. In a button blank cutting machine, the combination of a frame, a hollow saw spindle journaled therein, a tubular saw mounted on one end of said spindle, a cross-head coupled to the inner end of said spindle permitting rotation of the latter, an anti-friction thrust bearing between the inner end of said spindle and said cross-head, a pair of tubular thrust rods slidably mounted in said frame and connected at their forward ends to said cross-head on opposite sides of said spindle respectively, collars on said thrust rods, compression springs between said collars and a wall of said frame for retracting said spindle, a lever pivoted in said frame and engaged with said collars to actuate said spindle on its advance movement, a hollow arbor slidably mounted in said spindle and terminating at one end in an axially bored chuck member extending lengthwise through said saw, a valve casing connected to the rear end of said arbor, a spring-closed valve in said casing, a cross-head between said thrust rods and abutting against the rear end of said valve casing, a spring for retracting said arbor and valve casing, a lever for operating said last-mentioned cross-head, cams for actuating both of said levers, and means actuated by said spindle actuating lever for opening said valve on the advance movement of said spindle.

6. In a button blank cutting machine, the combination with a pair of aligned oppositely facing tubular saws, of means for chucking the blank to be cut between said saws, means for rotating said saws, means for advancing said saws each partly through the blank from opposite sides of the latter respectively and subsequently withdrawing the same, and means under the operator's control for operating said last mentioned means arranged when moved in one direction to complete an advancing and withdrawing movement of said saws and when moved in the opposite direction to complete another similar movement.

7. In a button blank cutting machine, the combination with a pair of aligned oppositely facing tubular saws, of means for chucking the blank to be cut between said saws, means for rotating said saws, means for advancing said saws one slightly ahead of the other each partly through the blank from opposite sides of the latter respectively and withdrawing the same in the same timed relation to each other, and means under the operator's control for operating said last mentioned means arranged in one operation in one direction to complete an advancing and withdrawing movement of each of said saws and when operated in the return direction to complete a similar movement of said saws, the saw which leads in one operation being arranged in the next operation to lag.

CARL O. STOHLGREN.

CERTIFICATE OF CORRECTION.

Patent No. 1,641,462. Granted September 6, 1927, to

CARL O. STOHLGREN.

It is hereby certified that error appears in the printed specification of the above numbered patent requiring correction as follows: Page 4, line 57, claim 3, strike out the word "adjustable"; and that the said Letters Patent should be read with this correction therein that the same may conform to the record of the case in the Patent Office.

Signed and sealed this 11th day of October, A. D. 1927.

Seal.

M. J. Moore,
Acting Commissioner of Patents.